[11] 3,572,936

[72] Inventors Cameron L
Gales Ferry;
Gerald M. Mayer, East Lyme, Conn.; Peter Shajenko, Hampden, Mass.
[21] Appl. No. 815,597
[22] Filed Apr. 14, 1969
[45] Patented Mar. 30, 1971
[73] Assignee The United States of America as represented by the Secretary of the Navy

[54] STROBOSCOPIC INTERFEROMETRIC HOLOGRAPHY
7 Claims, 7 Drawing Figs.

[52] U.S. Cl.......................................................... 356/109,
73/67, 73/71.3
[51] Int. Cl........................................................ G01b 9/02
[50] Field of Search............................................ 356/109;
350/3.5; 73/71.3

[56] References Cited
OTHER REFERENCES

" Stroboscopic Hologram Interferometry for Transducers."
An article From Wireless World, Oct. 1967. p. 471.
Watrasiewicz, B. M. et al. " Vibration Analysis By Strobo-ol. 217, Mar. 23, 1968. p. 1142— 1145.
Haines, K. A. et al., " Surface Deformation Measurement Using the Wavefront Reconstruction Technique." Applied Optics, Vol. 5, No. 4. p. 595-602. April, 1966.

*Primary Examiner*—Ronald L. Wibert
*Assistant Examiner*—T. Major
*Attorneys*—Louis A. Miller, Louis B. Applebaum and Philip Schneider ABSTRACT: Means and method for stroboscopic interferometric holography consisting of passing the laser beam which is used to illuminate the object through a Pockels cell and pulsing the Pockels cell by means of a pulse which is derived from, and therefore synchronized with, a sine wave generator whose output is used to vibrate said object. The pulse duration and its phase position with respect to the sine wave are variable. A double-image hologram is made consisting of a stroboscopic (pulsed) exposure at the positive peak of the sine wave and at either the zero value or the negative peak, resulting in a hologram of the object including a gross interference fringe pattern. The hologram can then be converted to a conventional photograph. A second technique includes rotation of the object through a small angle before the second image is made.

INVENTORS.
CAMERON D. JOHNSON
GERALD M. MAYER
PETER SHAJENKO
BY Philip Schneider
ATTORNEYS Patented March 30, 1971

INVENTORS.
CAMERON D. JOHNSON
GERALD M. MAYER
PETER SHAJENKO
BY Philip Schneider
Lou B. Appleton
ATTORNEYS Patented March 30, 1971

INVENTORS
CAMERON D. JOHNSON
GERALD M. MAYER
PETER SHAJENKO
BY Philip Schneider
L. B. Appleton
ATTORNEYS INVENTORS.
KAMERON D. JOHNSON
GERALD M. MAYER
PETER SHAJENKO
BY Philip Schneider
Lou D. Applebe
ATTORNEYS

STROBOSCOPIC INTERFEROMETRIC HOLOGRAPHY

The invention described herein may be manufactured and used by or for the Government of the United States of America for governmental purposes without the payment of any royalties thereon or therefor.

This invention relates to holography and especially to stroboscopic interferometric holography.

In stress and vibration analyses, such as the analysis of distortions in sonar transducers, it is desirable to have techniques for the visual representation of distortion. Most sonar transducers operate with either a radial or a plane motion as the major component of motion. It is of interest to know the irregularities in the plane motion, for example. Previous techniques of analysis have been applicable only when transducers operate far below their design levels, or when the distortions or irregularities constitute a large percentage of the overall motion. The present stroboscopic technique can eliminate the gross planar or radial motion. It is capable of isolating any phase of the motion and comparing it to any other phase. It is capable of investigating distortion which is phase dependent.

Previous methods for the analysis of vibrations, other than the Powell-Stetson holographic technique, have been noncontinuous measurements. The Powell-Stetson technique (time-average exposure) is limited to analysis of objects moving in simple harmonic motion, is limited in analysis of amplitude by the fact that fringe contrast decreases with the zero-order Bessel function, is unable to isolate phase-dependent motion or distortions, and is unable to determine relative phases of simple or complex vibration patterns.

Stroboscopic interferometric holography is a technique for analyzing vibration that overcomes present amplitude limitations and allows phase investigations of objects in any periodic motion with a low-power CW laser. It is applicable to objects moving in any repetitive motion, whether simple harmonic or not. It retains the three-dimensional and continuous measurement qualities of the hologram process. It is not limited in amplitude by the falling off of fringe contrast with the zero-order Bessel function. The amplitude of vibration is limited only by film resolution and the pulse duration of the light.

Most vibrating surfaces do not have ideal boundary conditions nor do they follow classical mode shapes. There is no present technique for analyzing relative phases of vibratory motion. However, the stroboscopic technique combined with a slight rotation is capable of analyzing relative phase relationships.

The usefulness of stroboscopic interferometric holography extends into the areas of vibration analysis, stress analysis, quality control and empirical testing procedures.

An object of this invention is to provide new holographic means and technique for vibratory structure analysis that allow phase investigations of objects in vibratory motion and that overcome the amplitude limitations of present methods.

Another object is to provide new holographic means and technique for vibratory structure analysis that maintain equal fringe contrast in the interference fringe pattern and retains the continuous measurement quality of the holographic process.

A further object is to provide new holographic means and technique for the analysis of vibrating structures which are capable of isolating any phase of the motion and comparing it to any other phase, and are capable of investigating distortion that is phase-dependent.

Yet another object is to provide new holographic means and technique for analyzing relative phase relationships in the motion of vibrating structures.

The objects and advantages of the present invention are provided by repetitively vibrating an object which is to be investigated, stroboscopically illuminating the object by pulses of coherent, monochromatic light, and making a double-image hologram of the vibrating object, a series of exposures being made at two different displacement points in the motion of said object.

Other objects, advantages and novel features of the invention will become apparent from the following detailed description of the invention when considered in conjunction with the accompanying drawings.

Figure 1:
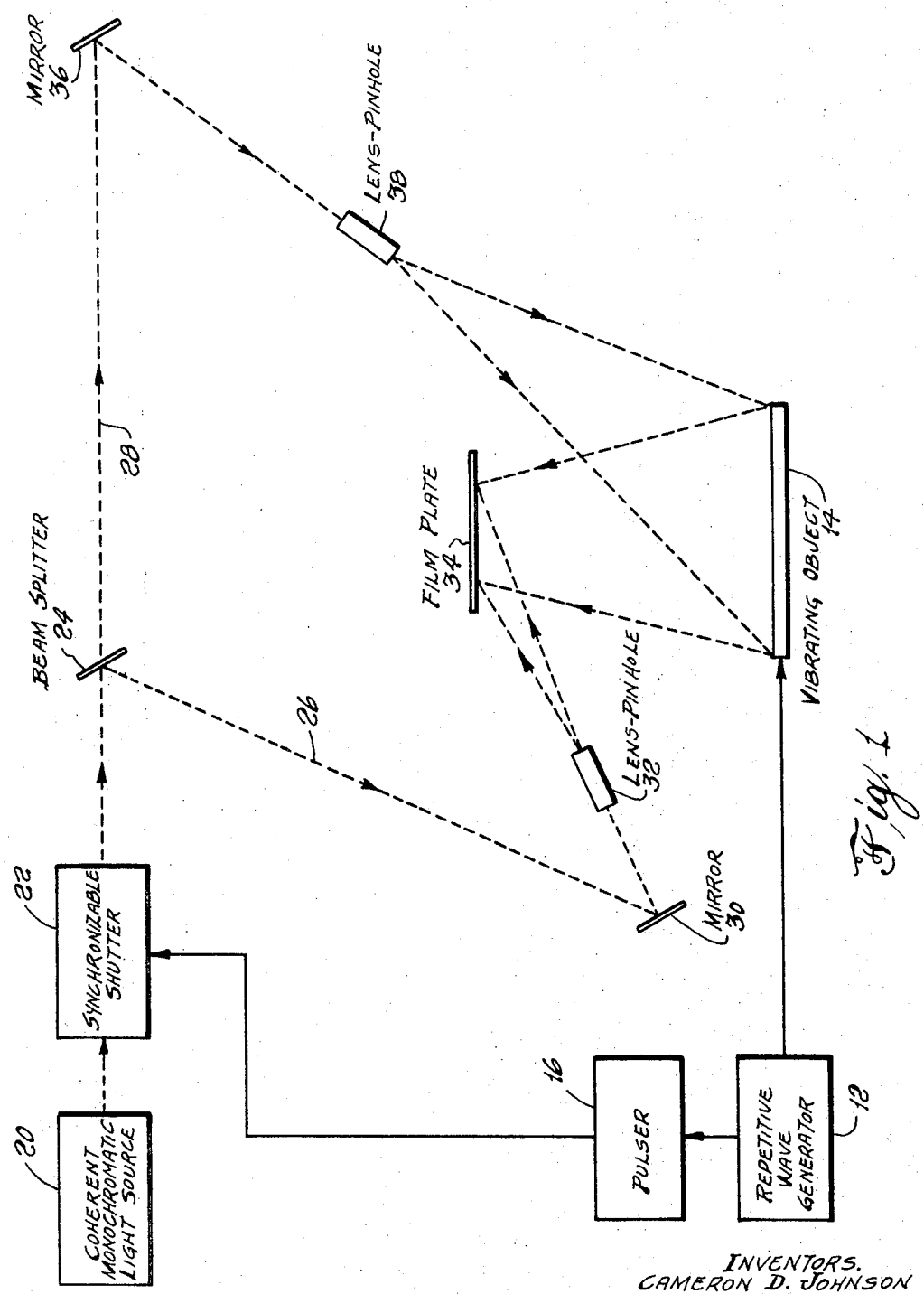
FIG. 1 is a schematic illustration of an embodiment of the invention.

FIG. 1 shows one embodiment of the invention. A repetitive wave generator 12 generates an output, for example, a sine wave, which is used to vibrate an object 14. The object 12 may be a sonar transducer, or a thin, metal plate, for example. (The case of a thin, metal plate will be discussed hereinafter.) Note that the term "repetitive wave" as used herein includes the case of a series of pulses of the same shape occurring at irregular intervals, but sufficiently often to maintain said object 14 in vibrational movement.

The output of the repetitive wave generator 12 is also used to synchronize a pulser (pulse generator) 16 which is able to produce two pulses per repetition of the repetitive wave. It is also highly desirable that the pulses be variable in phase relative to the repetitive wave and that the pulse width be variable. It is to be noted that the wave supplied by the generator 12 need not be periodic, although in actual practice this is usually so, but must be repetitive. Thus, a single pulse repeated at irregular intervals could be used to vibrate the object and the pulser 16 would have to open the shutter 22 at the same instant relative to each output pulse of the generator 12. The term "stroboscopic pulses" is applied to the output of the pulser 16 and is taken herein to mean pulses which are synchronized with the output of the repetitive wave generator, that is, which occur at the same points in each repetition of the wave (e.g., at the zero and positive peak points of a sine wave if a sine wave is the repetitive wave).

The output of the pulser 16 is fed to a synchronizable shutter 22 which passes light when a pulse is applied. The shutter 22 may, for example, consist of a Pockels cell and a Glan-Thompson polarizing prism. The prism is rotated to obtain minimum transmission (less than 0.5 percent of the output of the light source) and, when the pulse is applied to the Pockels cell, a transmission of approximately 90 percent is obtainable.

The light source 20 must provide coherent, monochromatic light; a helium-neon gas laser, for example, provides such light.

The remainder of the setup is conventional. The light (dotted lines), after passing through the shutter 22, is split by a beam splitter 24 into a reference beam 26 and an illuminating beam 28. The reference beam 26 is reflected by a mirror 30 through a lens-pinhole spatial filter 32 onto the film plate 34. The illuminating beam 28 is reflected by mirror 36 through another lens-pinhole spatial filter 38 onto the vibrating plate 14 from which it is further reflected onto the film plate 34. The lens-pinhole spatial filters are not necessary but are used because they provide a somewhat clearer picture.

The shutter 22 is pulsed, and an exposure is made, at two points in a cycle of the periodic wave. (A periodic wave will be discussed hereinafter since the repetitive wave would generally be periodic in actual practice.) For example, one pulse can coincide with the positive peak of the sine wave and the other pulse with the zero amplitude point (axis crossing). Or the pulses can be made to occur at the positive and negative peak points.

Thus, two partial images are recorded at two different phases of the motion (or displacements) of the vibrating object 14. Interference fringes are produced for each wavelength of path difference between the two partial images. Each fringe represents the locus of points vibrating with equal amplitude. If the pulse width of the light is sufficiently short, the exposures show the object in two substantially stationary, but displaced, positions and the fringe pattern records the difference in displacement between these two positions. Because each image is essentially stationary, the fringe contrast is the same as for a statically deformed object. The fringe contrast remains constant for increasing amplitude of vibration of the object and is limited only by the film resolution and the pulse duration.

The number of cycles over which the exposures are made depends on the intensity of the light from the laser source and the speed of the film which is used. With the present technique, low intensity CW lasers can be employed with their attendant advantage of long coherence intervals. An exposure is made for each stroboscopic pulse, each exposure resulting in the recording of a partial image on the film. The result of the proper number of exposures of the vibrating object in a single position is an image. Since there are exposures of the object at two different displacement points, a double image results.

Figure 2:
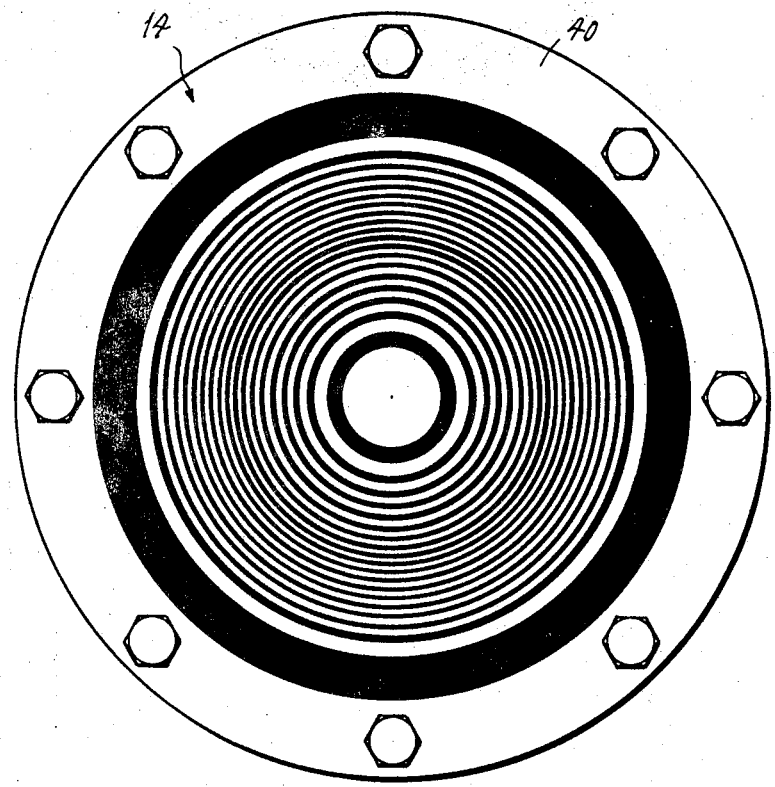
FIG. 2 is an illustration showing an undistorted fringe pattern of a circular metal plate.

FIG. 2 shows the fringe pattern for a thin, circular, metal plate vibrated at 160 $H_z$. No distortion is present and no fringe pattern is obtained on the edge 40 of the plate which is bolted to a support and therefore does not vibrate. Previous methods of analysis provide fringe patterns which decrease in intensity from the outer periphery to the center and which may therefore become too indistinct to read at the center.

Figure 3A:
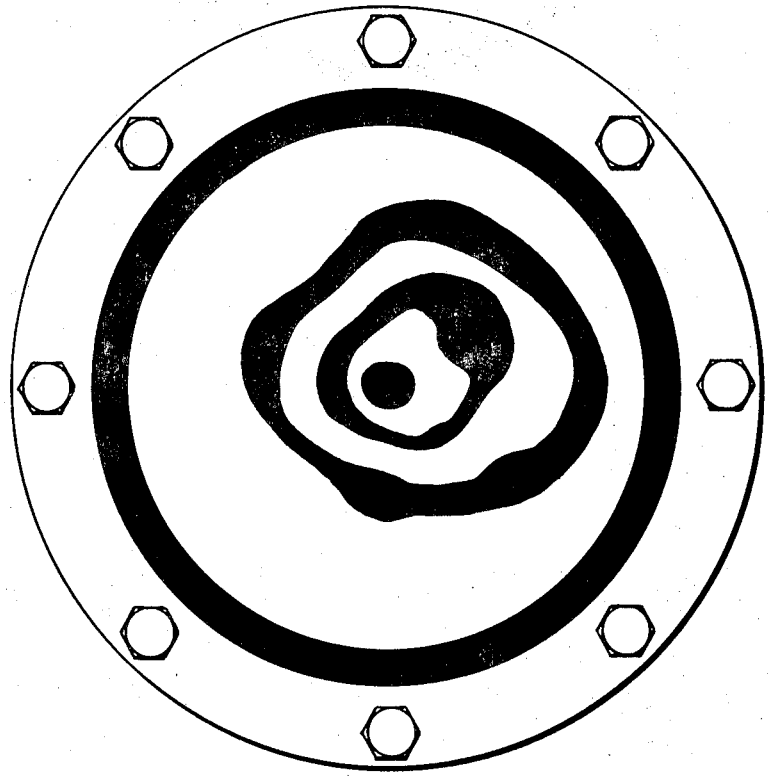
FIG. 3a is an illustration showing a distorted fringe pattern.
Figure 3B:
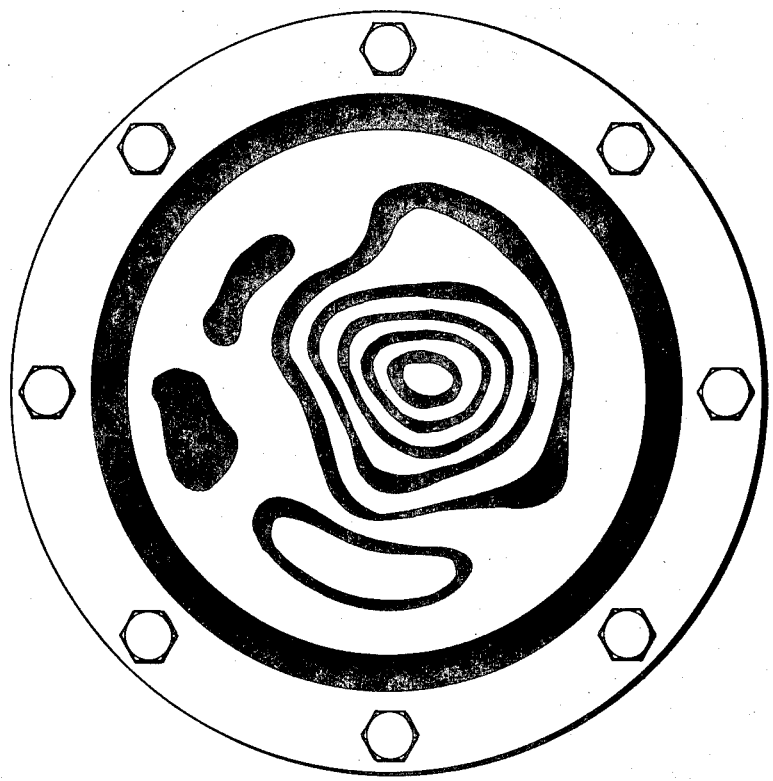
FIG. 3b is an illustration showing what happens to the fringe pattern of FIG. 3a if the phase of one of the shutter pulses is changed by 180°.

If deformation is introduced into the plate by some means, for example, a stationary bolt which is struck by one side of the plate as the plate vibrates, the fringe pattern shows the distortion. FIGS. 3a and 3b show such distortion, the difference being that, in FIG. 3a, the first pulse is at the zero point and the second pulse at the positive peak of the sine wave and, in FIG. 3b, the second pulse is shifted in phase by 180° (pulse at negative peak of sine wave). Thus, the stroboscopic technique makes it possible to observe a phase-dependent asymmetry in the vibrating plate. The usual time-average (Powell-Stetson) technique fails to provide such information.

The accuracy of the information obtained is affected by the pulse width since the plate actually is moving during each exposure.

Figure 4:
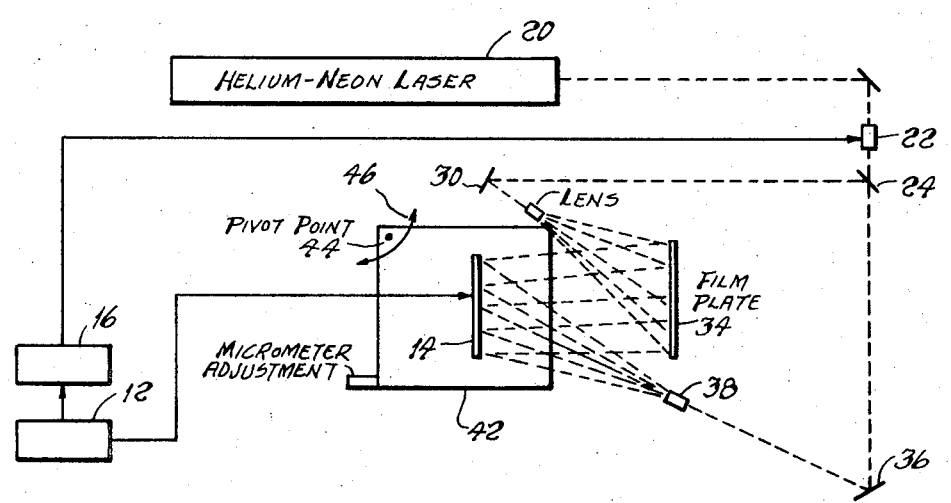
FIG. 4 is a schematic illustration of an embodiment of the invention useful for rotation-strobe holography.

FIG. 4 shows a setup which can be used for rotation-strobe holography, a variation of stroboscopic interferometric holography. The object to be observed 14 is placed on a table or plate 42 capable of rotating through small angles around a pivot point 44 in the directions of the arrows 46. If the object 14 is rotated between exposures, the resultant double-exposure hologram shows a pattern of vertical fringes. If the surface of the object has not been deformed between exposures, the vertical fringes appear as straight lines. If deformation has occurred, the vertical fringes will be distorted in a manner governed by the contours of the deformed surface. Observation of the distortions in the vertical fringes then yields directly the relative phase of all parts of the deformed surface, i.e., which portions are deformed towards the observer and which portions away from the observer.

The direction in which the fringes distort is dependent on the direction of rotation and the sequence of exposures. These considerations are unimportant if all that is desired is an indication of relative phase of various parts of a vibrating surface, since relative phase may be obtained regardless of exposure sequence or rotation direction. If, however, it is necessary to determine phase relative to an excitation function or some other response function, the sequence and rotation direction must be noted. There are four possible cases to consider, two sequences each for clockwise and counterclockwise rotation.

Figure 5:
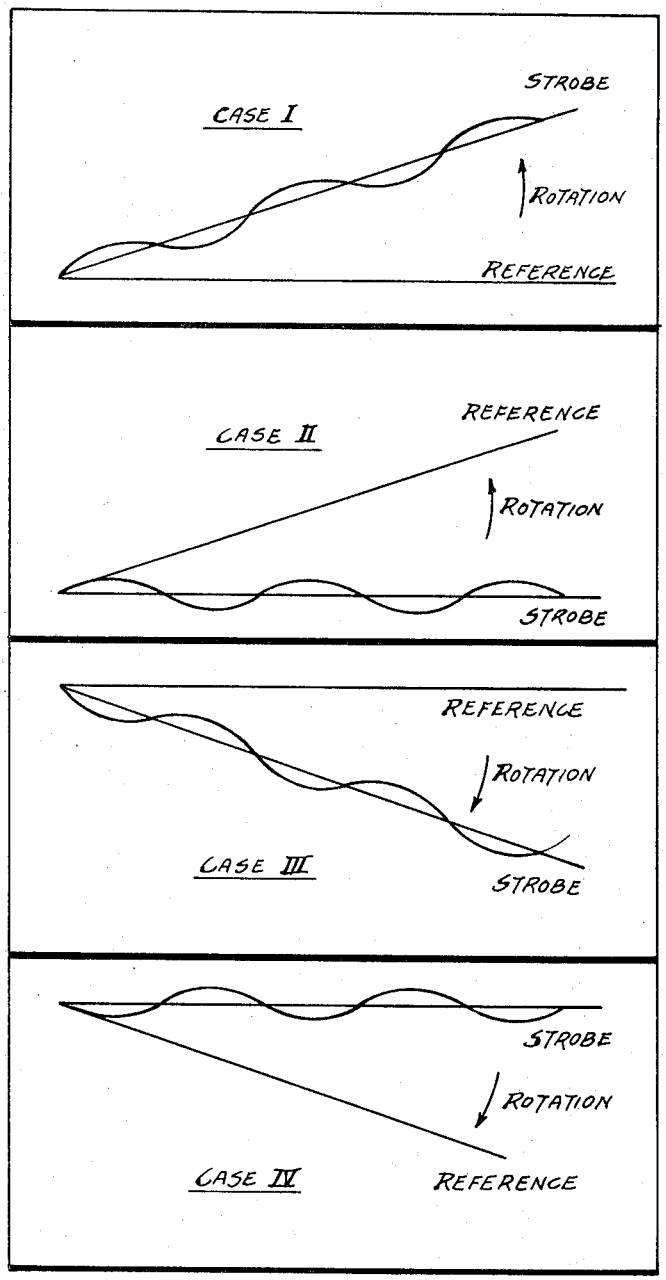
FIG. 5 shows diagrams illustrating the four possible cases of rotation-strobe holography.

Case I—Counterclockwise rotation sequence. A reference exposure is made with the object 14 at rest (i.e., nonvibratory, or at the zero displacement point of the vibrating wave). The object is rotated through a small counterclockwise angle, vibration of the object is commenced, and a series of stroboscopic exposures are made at the same point in the cycle of the vibrating wave (illustrated by a sine wave in FIG. 5). Displacement toward the observer distorts fringes to the observer's right.

Case II—Counterclockwise rotation sequence. The object is vibrated and a series of stroboscopic exposures are made. The object is then rotated counterclockwise and a nonvibratory (reference) exposure is made. Displacement toward the observer distorts fringes to the observer's left.

Case III—Clockwise rotation sequence. A reference exposure is made. The object is then rotated in a clockwise direction, vibration of the object is commenced, and a series of stroboscopic exposures is made. Displacement toward the observer distorts fringes to the observer's left.

Case IV—Clockwise rotation sequence. The object is vibrated and a series of stroboscopic exposures is made. The object is then rotated in a clockwise direction and a reference exposure is made. Displacement toward the observer will distort fringes to the observer's right. Thus, in FIG. 6, which is a Case IV type, the area of the object designated by numeral 48 indicates a displacement in the object toward the observer of the figure, and the area designated by numeral 50 is a displacement away from the observer. The vibrating object in the figure is a rectangular plate.

The angle of rotation required is quite small and easily obtainable with precision mechanical adjustments. For a helium-neon laser of wavelength 6,328 Angstroms, the angle required to give one vertical fringe per inch is $12.46 \times 10^{16}$ radians. For a rotation table having 10 inches between the axis of rotation and the adjustment point, an adjustment of $124.6 \times 10^{16}$ inches is required for one fringe per inch. For the convenient fringe density of four fringes per inch, an adjustment of approximately $0.5 \times 10^{13}$ inches is required and is easily obtained with a differential micrometer adjustment.

Figure 6:
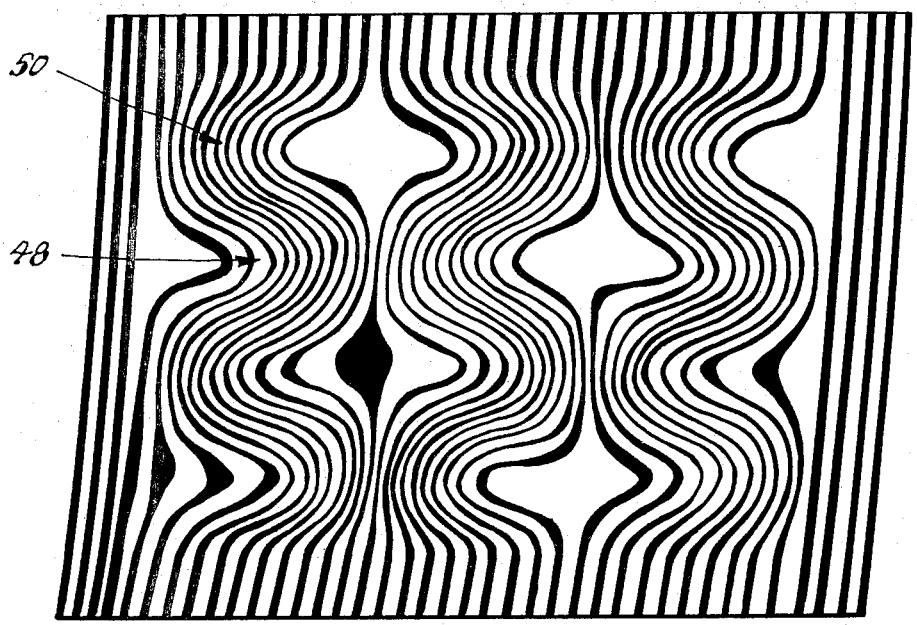
FIG. 6 is an illustration showing a fringe pattern obtained by means of rotation-strobe holography.

A thin steel plate was used for the hologram illustrated by FIG. 6. The plate was made of stainless steel, approximately 0.03 inches thick, 5 inches wide and 7 inches long. A uniform boundary condition was established by soldering a ½inch square frame around the plate. The plate was excited acoustically by placing a loudspeaker behind it and driving the speaker with an audiofrequency oscillator.

A conventional time-averaged hologram of the plate vibrating at 3,512 Hz. would show approximately the classical mode having zero vertical and three horizontal nodes. This time-averaged hologram would yield ambiguous results concerning relative phase of the four regions of vibration. FIG. 6, which illustrates the rotation-strobe hologram of the same mode, immediately resolves the ambiguity. It is apparent from FIG. 6 that the plate is indeed vibrating with phase relationships that would be expected for the corresponding classical mode, and it is quite easy to determine the relative phases from this figure.

This type of hologram is most useful for determination of relative phase of modes bearing little resemblance to classical modes. Relative phase of discrete elements of a large structure may also be conveniently measured.

Rotation-strobe holography can be used in another very interesting and useful manner. A reference image is made on the film plate and the plate is photographically developed to obtain a hologram. The film plate containing the reference hologram is then replaced in the exact location it occupied when the exposure was made. The object is now rotated, vibration is commenced and the usual stroboscopic exposure procedure is followed. No further image is formed on the film plate since it has been photographically developed, but if an observer stations himself at a proper location behind the film plate and looks through it at the vibrating object, he sees the interference fringe pattern which would be recorded on the film plate. Thus, distortions can be observed while they are actually occurring.

This type of holography can also be employed with the setup shown in FIG. 1. A single-image hologram can be made (e.g., with the object at rest, or with one stroboscopic pulse occurring at the zero crossing point while the object rotates) and, with the single-image hologram placed in the exact location of the film plate, the object can be stroboscopically illuminated again with light pulses strobed at another point on the sine wave (e.g., the positive peak). A second holographic image is formed on the film plate (although it is not recorded because the plate has been developed) and the observer views the double-image hologram by the light coming through the plate.

We claim:

1. A holographic technique comprising the steps of:
vibrating an object in accordance with a repetitive wave;
stroboscopically illuminating said object with coherent, monochromatic light for a plurality of repetitions of said repetitive wave;
a stroboscopic light pulse occurring once per repetition and at the same point in each repetition;
producing a hologram of the stroboscopically illuminated vibrating object;
rotating said object; and
producing another hologram of said object in its rotated position, said other hologram being produced as a double-image with the first hologram.

2. A holographic technique comprising the steps of:
stroboscopically illuminating an object with coherent, monochromatic light for a plurality of repetitions of said repetitive wave;
a stroboscopic light pulse occurring once per repetition and at the same point in each repetition;
producing a hologram of the stroboscopically illuminated vibrating object;
rotating said object;
vibrating said object in accordance with said repetitive wave; and
producing another hologram of said object in its rotated position, said other holgram being produced as a double-image with the first hologram.

3. A technique as in claim 1, including the step of making said other hologram with said object at rest.

4. A technique for stroboscopic interferometric holography comprising the steps of:
producing a hologram of an object at rest;
rotating said object in a clockwise direction;
vibrating said object in accordance with a repetitive wave;
stroboscopically illuminating said object with coherent, monochromatic light for a plurality of repetitions of said repetitive wave;
a stroboscopic light pulse occurring once per repetition and at the same point in each repetition; and
producing a second hologram of said object, first and second holograms constituting a double-image hologram.

5. A technique for stroboscopic interferometric holography comprising the steps of:
producing a hologram of an object at rest;
rotating said object in a counterclockwise direction;
vibrating said object in accordance with a repetitive wave;
stroboscopically illuminating said object with coherent, monochromatic light for a plurality of repetitions of said repetitive wave;
a stroboscopic light pulse occurring once per repetition and at the same point in each repetition; and
producing a second hologram of said object, first and second holograms constituting a double-image hologram.

6. A technique for stroboscopic interferometric holography comprising the steps of:
vibrating an object in accordance with a repetitive wave;
stroboscopically illuminating said object with coherent, monochromatic light for a plurality of repetitions of said repetitive wave;
a stroboscopic light pulse occurring once per repetition at the same point in each repetition;
producing a hologram of said stroboscopically illuminated object;
rotating said object in a clockwise direction;
removing the vibrations from said object to permit it to come to rest; and
producing a second hologram of said object at rest, first and second holograms constituting a double-image hologram.

7. A technique for stroboscopic interferometric holography comprising the steps of:
vibrating an object in accordance with a repetitive wave;
stroboscopically illuminating said object with coherent, monochromatic light for a plurality of repetitions of said repetitive wave;
a stroboscopic light pulse occurring once per repetition at the same point in each repetition;
producing a hologram of said stroboscopically illuminated object;
rotating said object in a counterclockwise direction;
removing the vibrations from said object to permit it to come to rest; and
producing a second hologram of said object at rest, first and second holograms constituting a double-image hologram.